US012293685B2

(12) United States Patent
Yan

(10) Patent No.: US 12,293,685 B2
(45) Date of Patent: May 6, 2025

(54) SPLICING ASSEMBLIES AND SPLICING DISPLAY SCREENS

(71) Applicant: Guangzhou China Star Optoelectronics Semiconductor Display Technology Co., Ltd., Guangdong (CN)

(72) Inventor: Ming Yan, Guangdong (CN)

(73) Assignee: Guangzhou China Star Optoelectronics Semiconductor Display Technology Co., Ltd., Guangdong (CN)

( * ) Notice: Subject to any disclaimer, the term of this patent is extended or adjusted under 35 U.S.C. 154(b) by 0 days.

(21) Appl. No.: 18/260,107

(22) PCT Filed: Apr. 17, 2023

(86) PCT No.: PCT/CN2023/088599
§ 371 (c)(1),
(2) Date: Jun. 30, 2023

(87) PCT Pub. No.: WO2024/197992
PCT Pub. Date: Oct. 3, 2024

(65) Prior Publication Data
US 2024/0379029 A1    Nov. 14, 2024

(30) Foreign Application Priority Data
Mar. 30, 2023    (CN) .......................... 202310335490.X

(51) Int. Cl.
G09F 9/302    (2006.01)
(52) U.S. Cl.
CPC .................................. G09F 9/3026 (2013.01)

(58) Field of Classification Search
CPC ...................................................... G09F 9/3026
See application file for complete search history.

(56) References Cited

U.S. PATENT DOCUMENTS 4,920,233 A *  4/1990  Kincaid ............... H01B 11/146
                                                        178/45
5,125,100 A *  6/1992  Katznelson ............ H04H 20/78
                                                      348/E7.024

(Continued)

FOREIGN PATENT DOCUMENTS

CN    206478406 U    9/2017
CN    209012737 U    6/2019
(Continued)

OTHER PUBLICATIONS

International Search Report in International application No. PCT/CN2023/088599, mailed on Nov. 22, 2023.

(Continued)

Primary Examiner — Michael B. Pierorazio
(74) Attorney, Agent, or Firm — PV IP PC; Wei Te Chung

(57) ABSTRACT

A splicing assembly and a splicing display screen are disclosed. A first adjustment module includes a first support block and a first support pillar. The first support block is slidably connected to a support frame along a first direction. The first support pillar passes through the first support block and a connecting plate in sequence along a second direction. The first support pillar is screwed with the first support block, and the connecting plate is hung on the first support pillar. An adjusting part passes through the connecting plate along a third direction and abuts against the first support pillar, and the adjusting part is screwed with the connecting plate.

20 Claims, 5 Drawing Sheets

(56) References Cited

U.S. PATENT DOCUMENTS

| | | | | |
|---|---|---|---|---|
| 5,481,389 | A * | 1/1996 | Pidgeon | H04B 10/2933 398/208 |
| 5,604,528 | A * | 2/1997 | Edwards | H04N 7/1675 380/240 |
| 5,834,697 | A * | 11/1998 | Baker | H01B 11/02 174/34 |
| 5,930,678 | A * | 7/1999 | Alley | H04L 5/06 455/69 |
| 6,466,913 | B1 * | 10/2002 | Yasuda | G10L 21/00 704/E21.001 |
| 6,721,371 | B1 * | 4/2004 | Barham | H03H 17/0294 329/363 |
| 7,530,091 | B2 * | 5/2009 | Vaughan | H04M 7/006 725/127 |
| 7,883,363 | B2 * | 2/2011 | Montena | H01R 24/44 439/654 |
| 8,045,066 | B2 * | 10/2011 | Vorenkamp | H01L 23/5227 348/731 |
| 8,429,695 | B2 * | 4/2013 | Halik | H04L 12/2801 725/127 |
| 8,589,997 | B2 * | 11/2013 | Wells | H04N 21/6118 725/127 |
| 8,611,528 | B2 * | 12/2013 | Hazani | H04B 3/542 379/413.04 |
| 11,961,426 | B2 * | 4/2024 | Zou | G09F 9/3026 |
| 2001/0046268 | A1 * | 11/2001 | Sharma | H04J 1/05 348/E7.069 |
| 2002/0056135 | A1 * | 5/2002 | Sharma | H04N 7/22 348/E7.07 |
| 2004/0244053 | A1 * | 12/2004 | Golombek | H04N 21/6118 725/127 |
| 2005/0056454 | A1 * | 3/2005 | Clark | H01B 11/02 174/113 R |
| 2006/0124342 | A1 * | 6/2006 | Clark | H01B 11/02 174/113 R |
| 2006/0141976 | A1 * | 6/2006 | Rohde | H03D 7/1441 455/326 |
| 2008/0227333 | A1 * | 9/2008 | Hazani | H01R 13/719 439/578 |
| 2008/0231111 | A1 * | 9/2008 | Hazani | H01R 31/065 307/3 |
| 2010/0017842 | A1 * | 1/2010 | Wells | H04M 11/066 725/149 |
| 2010/0100918 | A1 * | 4/2010 | Egan, Jr. | H04N 7/102 725/111 |
| 2010/0125877 | A1 * | 5/2010 | Wells | H04N 7/17309 725/127 |
| 2010/0146564 | A1 * | 6/2010 | Halik | H04N 7/104 725/127 |
| 2010/0311277 | A1 * | 12/2010 | Montena | H01R 24/44 333/260 |
| 2011/0154429 | A1 * | 6/2011 | Stantchev | H01Q 1/24 343/702 |
| 2012/0151548 | A1 * | 6/2012 | Rakib | H04N 7/22 725/126 |
| 2013/0125193 | A1 * | 5/2013 | Wells | H04N 21/6168 725/127 |
| 2013/0227632 | A1 * | 8/2013 | Wells | H04L 12/2801 725/127 |
| 2014/0033264 | A1 * | 1/2014 | Li | H04N 21/61 725/127 |
| 2020/0182395 | A1 * | 6/2020 | Rao | F16M 11/10 |
| 2023/0206787 | A1 * | 6/2023 | Zou | G09F 9/3026 361/679.01 |

FOREIGN PATENT DOCUMENTS

| | | |
|---|---|---|
| CN | 209569472 U | 11/2019 |
| CN | 211145828 U | 7/2020 |
| CN | 112097029 A | 12/2020 |

OTHER PUBLICATIONS

Written Opinion of the International Search Authority in International application No. PCT/CN2023/088599, mailed on Nov. 22, 2023.

* cited by examiner

SPLICING ASSEMBLIES AND SPLICING DISPLAY SCREENS

CROSS REFERENCE TO RELATED APPLICATIONS

This application is a US national phase application based upon an International Application No. PCT/CN2023/088599, filed on Apr. 17, 2023, which claims priority to Chinese Patent Application No. 202310335490.X, filed on Mar. 30, 2023. The entire disclosures of the aforementioned applications are incorporated herein by reference in their entireties.

TECHNICAL FIELD

The present disclosure relates to a field of display technologies, and in particular to splicing assemblies and splicing display screens.

BACKGROUND

With the continuous development of display technologies, applications of display devices are becoming more and more widespread, not only for televisions, monitors, industrial displays, medical displays, but also for public displays. In public display applications, requirements for long-distance viewing and large information display is met usually by multi-screen splicing.

Splicing screens usually involves transporting multiple screens to the site and assembling them in sequence. In existing technologies, adjustment devices for splicing screen seam requires professional personnel to use professional tools for on-site installation. In order to ensure splicing accuracy, workers need to repeatedly confirm the position of the screens, which is difficult to achieve rapid adjustment. Moreover, the splicing adjustment angle is single, and the adjustment accuracy is not high, which undoubtedly increases the complexity of the installation steps, causing low installation efficiency.

SUMMARY

The embodiments of the present disclosure provide a splicing assembly and a splicing display screen to solve the defects in the related technologies.

In order to achieve the above functions, the technical solutions provided by the embodiments of the present disclosure are as follows.

An embodiment of the present disclosure provides a splicing assembly, including:
 a support frame;
 a connecting piece located on a side of the support frame and including a connecting plate and an adjusting part; and
 an adjusting piece disposed on the support frame and including a first adjustment module.

The first adjustment module includes a first support block and a first support pillar, the first support block is slidably connected to the support frame along a first direction, the first support pillar passes through the first support block and the connecting plate along a second direction in sequence, the first support pillar is screwed with the first support block, the connecting plate is hung on the first support pillar, the adjusting part passes through the connecting plate along a third direction and abuts against the first support pillar, the adjusting part is screwed with the connecting plate, and the first direction, the second direction and the third direction are perpendicular to each other.

In the splicing assembly provided by an embodiment of the present disclosure, the first adjustment module further includes a fixing plate and a first fixing piece, the fixing plate is fixedly connected to the support frame, and the first fixing piece passes through the fixing plate along the first direction and is screwed with the first support block.

In the splicing assembly provided by an embodiment of the present disclosure, the first support block includes a first through hole and a second through hole, the first through hole penetrates the first support block along the second direction, and the second through hole is located on a side of the first support block close to the fixing plate.

The fixing plate includes a third through hole, the third through hole penetrates the fixing plate along the first direction, and the third through hole corresponds to the second through hole.

The first support pillar passes through the first through hole and is screwed with the first support block, the first fixing piece passes through the third through hole and the second through hole, and the first fixing piece is screwed with the first support block through the second through hole.

In the splicing assembly provided by an embodiment of the present disclosure, the first adjustment module further includes a first sliding guide rail, and the first sliding guide rail extends along the first direction and is fixedly connected to the support frame, and the first support block is slidably connected to the first sliding guide rail along the first direction.

In the splicing assembly provided by an embodiment of the present disclosure, the first adjustment module further includes a first locking piece, and the first locking piece includes a first locking mechanism and a second locking mechanism.

The first locking mechanism is located between the first support block and the first support pillar, the first locking mechanism is screwed with the first support pillar, and the second locking mechanism is located on a side of the first sliding guide rail close to the first support block, and the second locking mechanism is fixedly connected to the first support block.

In the splicing assembly provided by an embodiment of the present disclosure, the first support pillar includes a first support rod and a first handle, the first handle is located on a side of the first support block away from the connecting plate, one end of the first support rod is connected to the first handle, and another end of the first support rod is screwed with the first support block through the first through hole.

The first locking mechanism is located between the first handle and the first support block, the first locking mechanism is sleeved on the first support rod, and the first locking mechanism is screwed with the first support rod.

In the splicing assembly provided by an embodiment of the present disclosure, the first sliding guide rail includes a first sliding rail and a first guide rail, the first guide rail is screwed with the support frame, the first sliding rail is located on a side of the first guide rail close to the first support block, the first sliding rail is floatingly connected to the first guide rail, and the first support block is slidably connected to the support frame by the first sliding rail.

The second locking mechanism includes a limiting plate and a second fixing piece, one side of the limiting plate is fixedly connected to the first support block, another side of the limiting plate is slidably connected or fixedly connected to the first sliding rail, and the second fixing piece is screwed with the limiting plate.

In the splicing assembly provided by an embodiment of the present disclosure, the first adjustment module further includes a first positioning piece, the first positioning piece is located on a side of the first support block away from the support frame, the first positioning piece includes a scale and a positioning block, a graduation of the scale is disposed along the second direction, the positioning block includes a head, and the head is slidably connected to the scale along the second direction.

In the splicing assembly provided by an embodiment of the present disclosure, the first support block includes a groove.

The scale is located on a side of the first support block away from the support frame, an orthographic projection of the scale on the first support block does not overlap the groove, the positioning block is located in the groove, the first support pillar passes through the positioning block along the second direction, and the first support pillar is screwed with the positioning block.

In the splicing assembly provided by an embodiment of the present disclosure, the connecting plate includes a first opening and a second opening, the first opening is located on a side of the connecting plate close to the adjusting piece, and the second opening penetrates the connecting piece along the third direction.

The first support pillar passes through the first opening, and the connecting piece is hung on and connected to the first support pillar.

The adjusting part includes a first adjusting sub-part, and the first adjusting sub-part passes through the second opening along the third direction and abuts against the first support pillar.

In the splicing assembly provided by an embodiment of the present disclosure, the support frame includes a first support subframe and a second support subframe disposed in parallel along the third direction.

The adjusting piece includes the first adjustment module and a second adjustment module, the first adjustment module is located on the first support sub-frame, and the second adjustment module is located on the second support sub-frame.

The second adjustment module includes a second support block, a second support pillar, a second fixing piece, a second sliding guide rail, a second locking piece and a second positioning piece.

The present disclosure further provides a splicing display screen, including:
  a plurality of splicing panels; and
  a plurality of splicing assemblies, wherein a back side of each of the splicing panels is provided with at least one of the splicing assemblies, the plurality of the splicing assemblies are spliced to splice the plurality of the splicing panels, and each of the splicing assemblies includes:
    a support frame;
    a connecting piece located on a side of the support frame and including a connecting plate and an adjusting part; and
    an adjusting piece disposed on the support frame and including a first adjustment module.

The first adjustment module includes a first support block and a first support pillar, the first support block is slidably connected to the support frame along a first direction, the first support pillar passes through the first support block and the connecting plate along a second direction in sequence, the first support pillar is screwed with the first support block, the connecting plate is hung on the first support pillar, the adjusting part passes through the connecting plate along a third direction and abuts against the first support pillar, the adjusting part is screwed with the connecting plate, and the first direction, the second direction and the third direction are perpendicular to each other.

In the splicing display screen provided by an embodiment of the present disclosure, one of the splicing assemblies at least includes a first adjustment module and a second adjustment module in parallel.

In the splicing display screen provided by an embodiment of the present disclosure, each of the splicing assemblies is screwed and fixed with corresponding one of the splicing panels.

In the splicing display screen provided by an embodiment of the present disclosure, the first adjustment module further includes a fixing plate and a first fixing piece, the fixing plate is fixedly connected to the support frame, and the first fixing piece passes through the fixing plate along the first direction and is screwed with the first support block.

In the splicing display screen provided by an embodiment of the present disclosure, the first support block includes a first through hole and a second through hole, the first through hole penetrates the first support block along the second direction, and the second through hole is located on a side of the first support block close to the fixing plate.

The fixing plate includes a third through hole, the third through hole penetrates the fixing plate along the first direction, and the third through hole corresponds to the second through hole.

The first support pillar passes through the first through hole and is screwed with the first support block, the first fixing piece passes through the third through hole and the second through hole, and the first fixing piece is screwed with the first support block through the second through hole.

In the splicing display screen provided by an embodiment of the present disclosure, the first adjustment module further includes a first sliding guide rail, and the first sliding guide rail extends along the first direction and is fixedly connected to the support frame, and the first support block is slidably connected to the first sliding guide rail along the first direction.

In the splicing display screen provided by an embodiment of the present disclosure, the first adjustment module further includes a first locking piece, and the first locking piece includes a first locking mechanism and a second locking mechanism.

The first locking mechanism is located between the first support block and the first support pillar, the first locking mechanism is screwed with the first support pillar, and the second locking mechanism is located on a side of the first sliding guide rail close to the first support block, and the second locking mechanism is fixedly connected to the first support block.

In the splicing display screen provided by an embodiment of the present disclosure, the first support pillar includes a first support rod and a first handle, the first handle is located on a side of the first support block away from the connecting plate, one end of the first support rod is connected to the first handle, and another end of the first support rod is screwed with the first support block through the first through hole.

The first locking mechanism is located between the first handle and the first support block, the first locking mechanism is sleeved on the first support rod, and the first locking mechanism is screwed with the first support rod.

In the splicing display screen provided by an embodiment of the present disclosure, the first sliding guide rail includes a first sliding rail and a first guide rail, the first guide rail is screwed with the support frame, the first sliding rail is located on a side of the first guide rail close to the first support block, the first sliding rail is floatingly connected to the first guide rail, and the first support block is slidably connected to the support frame by the first sliding rail.

The second locking mechanism is located on both sides of the first support block along the first direction, the second locking mechanism includes a limiting plate and a second fixing piece, one side of the limiting plate is fixedly connected to the first support block, another side of the limiting plate is slidably connected or fixedly connected to the first sliding rail, and the second fixing piece is screwed with the limiting plate.

Beneficial Effects

The embodiments of the present disclosure provide the splicing assembly and the splicing display screen. The splicing assembly includes the support frame, the connecting piece and the adjusting piece. The connecting piece is located on the side of the support frame and includes the connecting plate and the adjusting part. The adjusting piece is disposed on the support frame and includes the first adjustment module. The first adjustment module includes the first support block and the first support pillar, the first support block is slidably connected to the support frame along the first direction, and the first support pillar passes through the first support block and the connecting plate in sequence along the second direction. The first support pillar is screwed with the first support block. The connecting plate is hung on the first support pillar. The adjusting part passes through the connecting plate along the third direction and abuts against the first support pillar. The adjusting part is screwed with the connecting plate. Thus, the plurality of the splicing panels may be adjusted efficiently and quickly through the splicing assembly, thereby improving the splicing seam adjustment accuracy of the splicing display screen to obtain a good display effect.

BRIEF DESCRIPTION OF THE DRAWINGS

The specific implementation method of the present disclosure is described in details below the accompanying drawings, which makes the technical solutions and other beneficial effects of the present disclosure obvious.

DETAILED DESCRIPTION

The technical solutions in the embodiments of the present disclosure will be described clearly and completely hereafter with reference to the accompanying drawings. Apparently, the described embodiments are only a part of but not all embodiments of the present disclosure. All other embodiments obtained by persons of ordinary skill in the art based on the embodiments of the present disclosure without creative efforts shall fall within the protection scope of the present disclosure.

The embodiments of the present disclosure provide a splicing assembly and a splicing display screen, which will be respectively described below in details. It should be noted that the description order of the following embodiments does not serve as a limitation on the preferred order of the embodiments.

The technical solutions of the present disclosure are described hereafter with reference to the specific embodiments.

Figure 1:
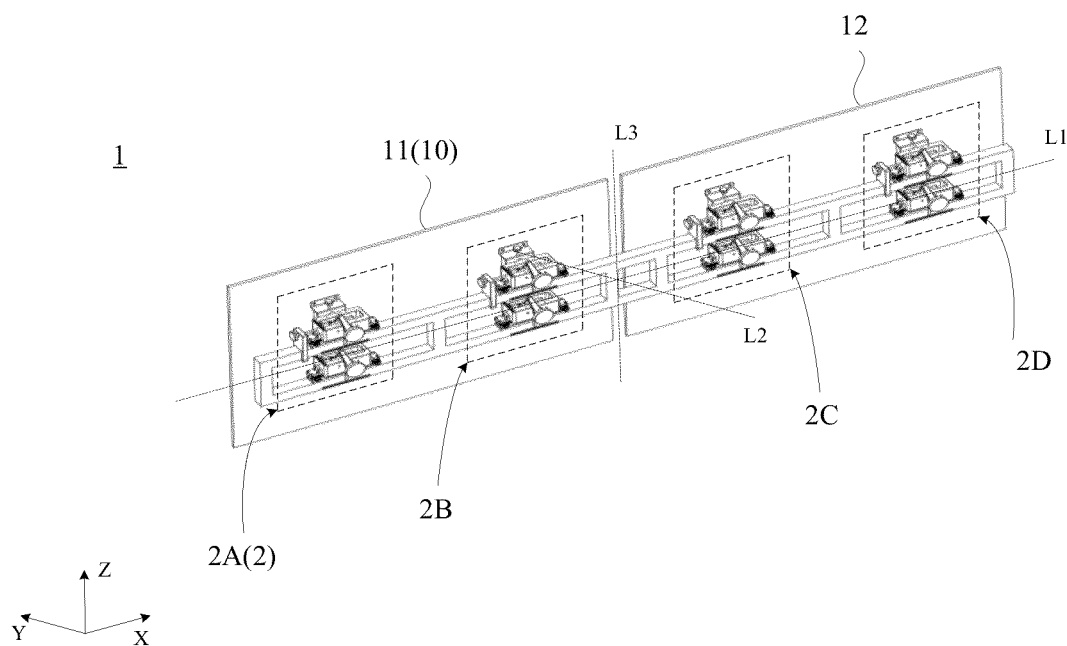
FIG. 1 is a first perspective structural schematic view of a splicing display screen provided by an embodiment of the present disclosure.

Referring to FIG. 1, which is a first perspective structural schematic view of a splicing display screen provided by an embodiment of the present disclosure.

The embodiment provides a splicing assembly 2 and a splicing display screen 1, and the splicing assembly 2 is applied to the splicing display screen 1. Specifically, the splicing display screen 1 includes a plurality of splicing panels 10, the splicing assembly 2 is used to splice the plurality of the splicing panels 10, and the splicing assembly 2 is screwed and fixed with the splicing panel 10. It should be noted that only two splicing panels 10 are shown as examples in FIG. 1.

In existing technologies, splicing screens usually involves transporting multiple screens to the site and assembling them in sequence. Adjustment devices for splicing screen seam requires professional personnel to use professional tools for on-site installation. In order to ensure splicing accuracy, workers need to repeatedly confirm the position of the screens, which is difficult to achieve rapid adjustment. Moreover, the splicing adjustment angle is single, and the adjustment accuracy is not high, which undoubtedly increases the complexity of the installation steps, causing low installation efficiency.

Figure 2:
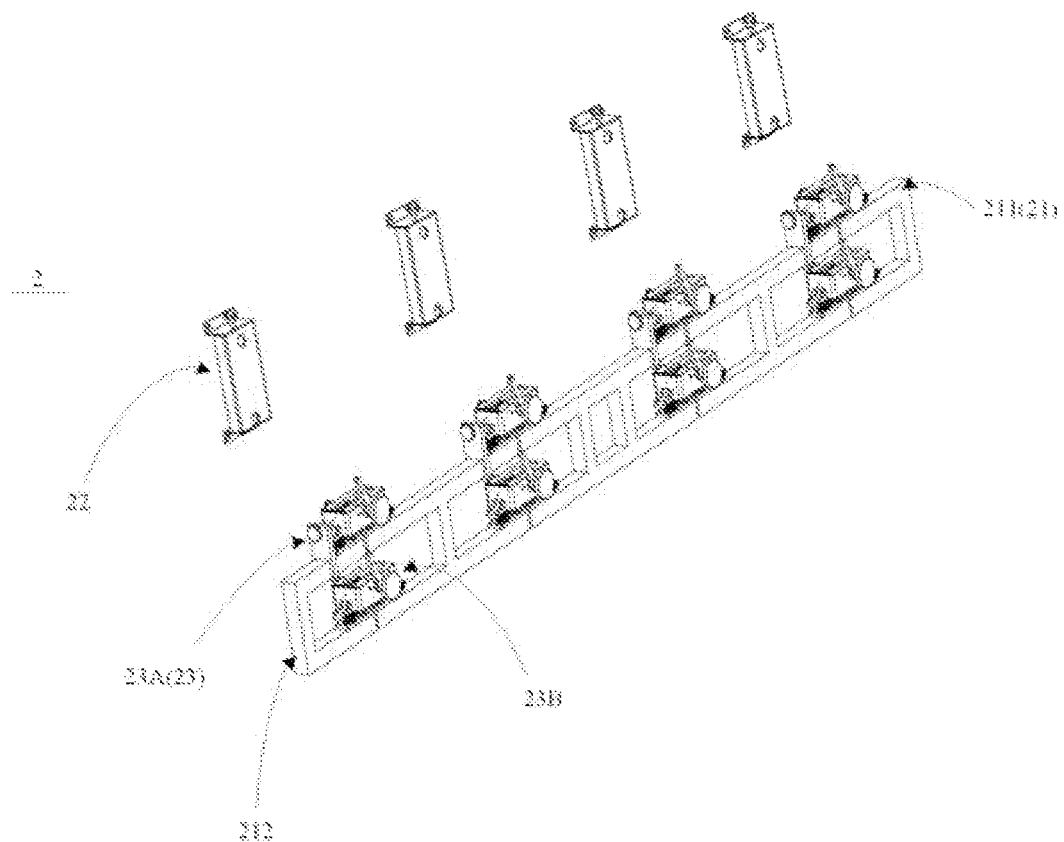
FIG. 2 is an exploded view of a splicing assembly provided by an embodiment of the present disclosure.
Figure 3:
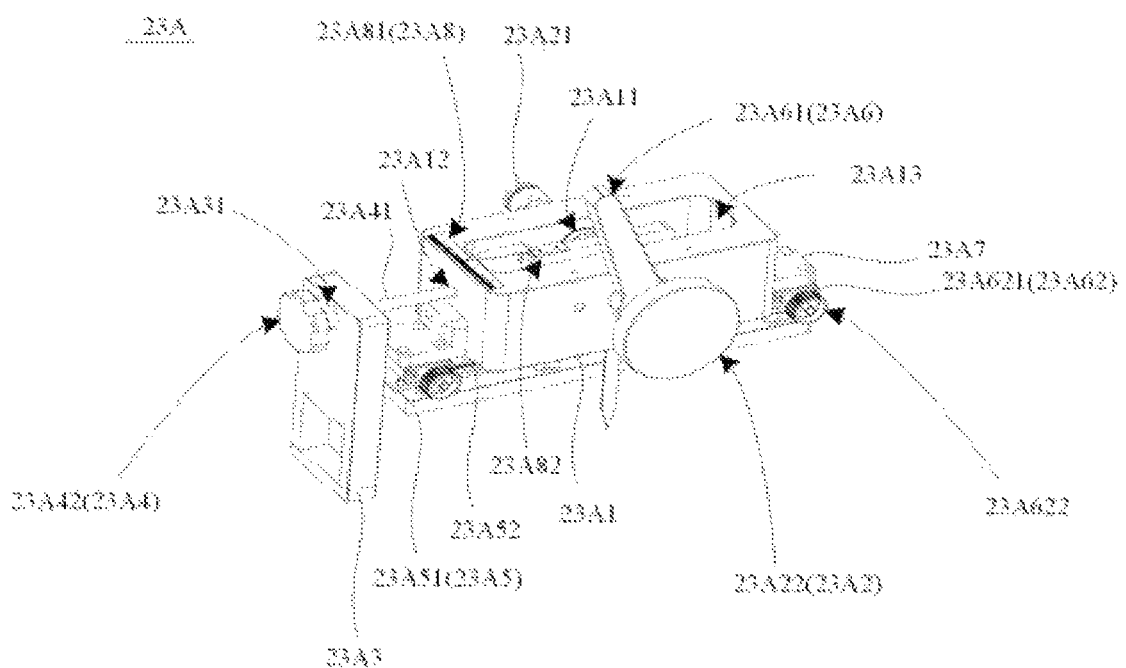
FIG. 3 is a structural schematic view of a first adjustment module provided by an embodiment of the present disclosure.
Figure 4:
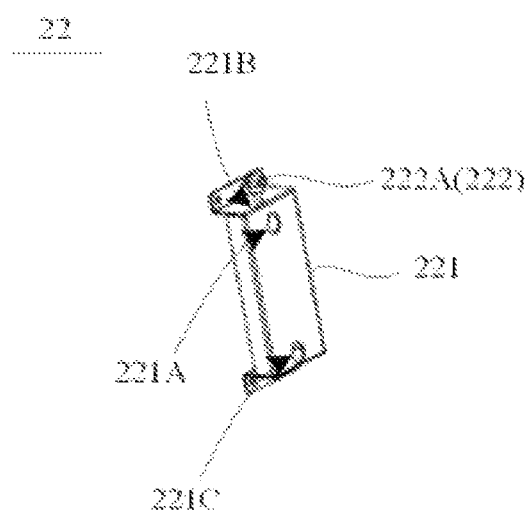
FIG. 4 is a structural schematic view of a connecting piece provided by an embodiment of the present disclosure.
Figure 5:
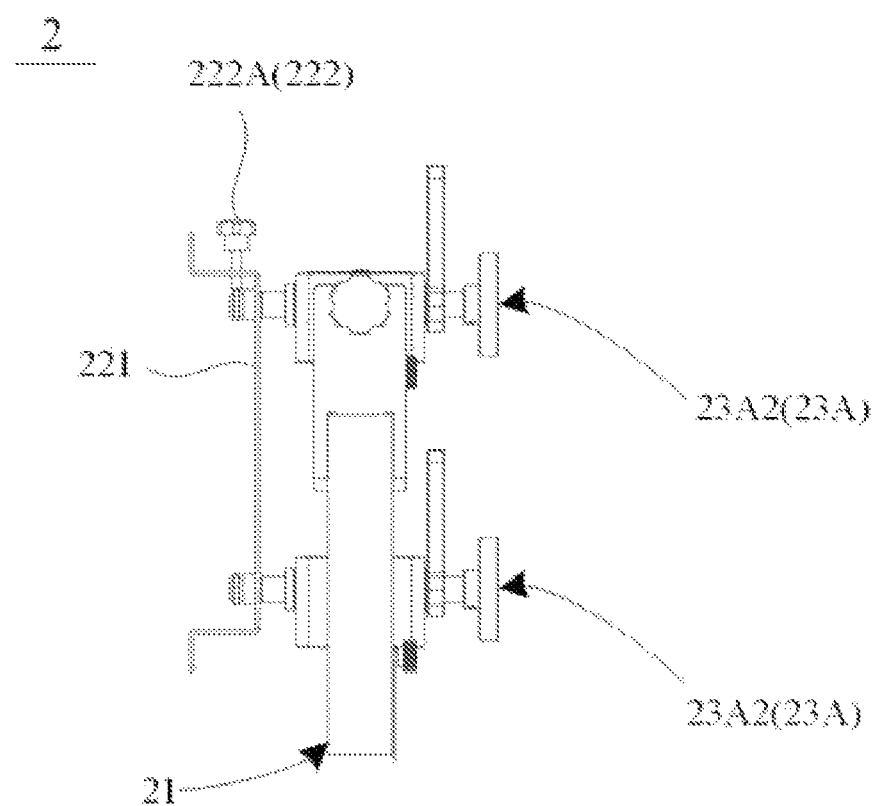
FIG. 5 is a side cross-sectional schematic view of the splicing assembly provided by an embodiment of the present disclosure.

Referring to FIGS. 2 to 4, FIG. 2 is an exploded view of the splicing assembly provided by an embodiment of the present disclosure, FIG. 3 is a structural schematic view of the first adjustment module provided by an embodiment of the present disclosure, and FIG. 4 is a structural schematic view of the connecting piece provided by an embodiment of the present disclosure. It can be understood that in the embodiment, the splicing assembly 2 includes a support frame 21, a connecting piece 22, and an adjusting piece 23. The connecting piece 22 is screwed and fixed with the splicing panel 10. The connecting piece 22 is located on a side of the support frame 21, the connecting piece 22 includes a connecting plate 221 and an adjusting part 222. The adjusting piece 23 is disposed on the support frame 21 and includes a first adjusting module 23A. The first adjustment module 23A includes a first support block 23A1 and a first support pillar 23A2. The first support block 23A1 is slidably connected to the support frame 21 along a first direction. The first support pillar 23A2 passes through the first support block 23A1 and the connecting plate 221 along a second direction Y in sequence. The first support pillar 23A2 is screwed with the first support block 23A1. The connecting plate 221 is hung on the first support pillar 23A2. The adjusting part 222 passes through the connecting plate 221 along a third direction Z and abuts against the first support pillar 23A2, and the adjusting part 222 is screwed with the connecting plate 221.

It should be noted that in the embodiment, the first direction X, the second direction Y, and the third direction Z are perpendicular to each other. The embodiment does not impose specific restrictions on the first direction, the second direction, and the third direction. However, for the convenience of description, the embodiment takes the first direction as X, the second direction as Y and the third direction as Z as examples to describe the technical solutions of the present disclosure.

Specifically, referring to FIGS. 2 to 5, FIG. 5 is a side cross-sectional schematic view of the splicing assembly provided by an embodiment of the present disclosure.

The first adjustment module 23A further includes a fixing plate 23A3 and a first fixing piece 23A4. The fixing plate 23A3 is fixedly connected to the support frame 21. The first fixing piece 23A4 passes through the fixing plate 23A3 along the first direction X and is screwed with the first support block 23A1. The first fixing piece 23A4 includes but is not limited to a hand screw.

Furthermore, in the embodiment, the first support block 23A1 includes a first through hole 23A11 and a second through hole 23A12. The first through hole 23A11 penetrates the first support block 23A1 along the second direction Y. The second through hole 23A12 is located on a side of the first support block 23A1 close to the fixing plate 23A3, and the second through hole 23A12 penetrates the first support block 23A1 along the first direction X. The fixing plate 23A3 includes a third through hole 23A31, which penetrates the fixing plate 23A3 along the first direction X, and corresponds to the second through hole 23A12. The first support pillar 23A2 passes through the first through hole 23A11 and is screwed with the first support block 23A1. The first fixing piece 23A4 passes through the third through hole 23A31 and the second through hole 23A12, and the first fixing piece 23A4 is screwed with the first support block 23A1 through the second through hole 23A12.

Referring to FIGS. 2 and 4, the connecting plate 221 includes a first opening 221A and a second opening 221B. The first opening 221A is located on a side of the connecting plate 221 close to the adjusting piece 23. The second opening 221B penetrates the connecting piece 22 along the third direction Z. The first opening 221A is interconnected to the second opening 221B. The adjusting part 222 includes a first adjusting sub-part 222A, which passes through the second opening 221B in the third direction Z, and the first adjusting sub-part 222A is screwed with the connecting plate 221 through the second opening 221B. The first support pillar 23A2 passes through the first opening 221A, and the connecting piece 22 is hung on the first support pillar 23A2. An aperture of the first opening 221A is larger than a diameter of the first support pillar 23A2, and the first support pillar 23A2 is abuts against the first adjusting sub-part 222A. The first adjusting sub-part 222A is located on a side of the first support pillar 23A2 away from the support frame 21.

Specifically, in the embodiment, the first support pillar 23A2 is screwed with the first support block 23A1 through the first through hole 23A11. A centerline of the third through hole 23A31 overlaps with a centerline of the second through hole 23A12, and the first fixing piece 23A4 is screwed with the first support block 23A1 through the second through hole 23A12.

It can be understood that in the embodiment, the first support pillar 23A2 passes through the first opening 221A, the connecting piece 22 is hung on the first support pillar 23A2, and the connecting piece 22 is fixed and screwed with the splicing panel 10, thereby achieving a fixed connection between the splicing assembly 2 and the splicing panel 10. Moreover, the first fixing piece 23A4 is screwed with the fixing plate 23A3 through the third through hole 23A31. The first fixing piece 23A4 is configured to not move relative to the fixing plate 23A3 along a direction of a second axis L2.

The first fixing piece 23A4 is screwed with the first support block 23A1 through the second through hole 23A12, so that in practical applications, the first fixing piece 23A4 is capable of being rotated in a positive or reverse direction, to achieve a reciprocating motion of the first support block 23A1 along the first direction X, and then to drive the splicing panel 10 to a reciprocating motion along the first direction X by the first support pillar 23A2 and the connecting piece 22.

Moreover, by disposing the first support pillar 23A2 to be screwed with the first support block 23A1 through the first through hole 23A11, the connecting piece 22 to be hung on the first support pillar 23A2 which passes through the first through hole 221A, so that in practical applications, the first support pillar 23A2 is capable of being rotated to achieve a reciprocating motion of the first support pillar 23A2 along the second direction Y. Furthermore, the splicing panel 10 is capable of being driven to a reciprocating motion along the second direction Y by the first support pillar 23A2 and the connecting piece 22.

Furthermore, the connecting plate 221 is configured to move relative to the first support pillar 23A2 along a direction of a third axis L3, and the first adjusting sub-part 222A is screwed with the connecting plate 221 through the second opening 221B, and the first adjusting sub-part 222A abuts against the first support pillar 23A2 through the first opening 221A, thus in practical applications, the first adjusting sub-part 222A is capable of being rotated in a positive or reverse direction to achieve a reciprocating motion of the connecting plate 221 in the third direction Z.

Specifically, since the first adjusting sub-part 222A abuts against the first support pillar 23A2, and the first adjusting sub-part 222A is screwed with the connecting plate 221 through the second opening 221B, in the case of the first adjusting sub-part 222A is rotated in the positive direction, the first adjusting sub-part 222A does not move relative to the first support pillar 23A2, and the connecting plate 221 moves along the third direction Z relative to the first support pillar 23A2. In the case of the first adjusting sub-part 222A is rotated in the reverse direction, the first adjusting sub-part 222A moves along the third direction Z relative to the first support pillar 23A2, and a connection between the connecting plate 221 and the first adjusting sub-part 222A is loosened. Due to the effect of gravity, the connecting plate 221 moves along a direction opposite to the third direction Z relative to the first support pillar 23A2. Furthermore, the splicing panel 10 is capable of being driven to a reciprocating motion along the third direction Z by the adjusting part 222 and the connecting piece 22.

It should be noted that the adjusting part 222 includes but is not limited to an adjusting nut. In the technical solutions of the present disclosure, taking it as an example that a connection between the first adjusting sub-part 222A and the connecting plate 221 is tightened when the first adjusting sub-part 222A is rotated in the positive direction, and the connection between the first adjusting sub-part 222A and the connecting plate 221 is loosened when the first adjusting sub-part 222A is rotated in the reverse direction.

It can be understood that in practical applications, the first adjusting sub-part 222A abuts against or is spaced apart from the first support pillar 23A2. In the case of the first adjusting sub-part 222A is spaced apart from the first support pillar 23A2, when rotating the first adjusting sub-part 222A in the positive direction, the first adjusting sub-part 222A moves along a direction opposite to the third direction Z relative to the first support pillar 23A2, thus, the first adjusting sub-part 222A is capable of abutting against the first support pillar 23A2. Continuing rotating the first adjusting sub-part 222A in the positive direction, the first adjusting sub-part 222A does not move relative to the first support pillar 23A2, and the connecting plate 221 moves relative to the first support pillar 23A2 along the third direction Z.

Based on the above, the embodiment provides the splicing assembly 2 and the splicing display screen 1. The splicing display screen 1 includes the plurality of the splicing panels 10, and the splicing assembly 2 is used to splice the plurality of the splicing panels 10. The splicing assembly 2 is screwed and fixed with the splicing panel 10, thereby adjusting the position of the splicing panel 10 in multiple directions such as the first direction X, the second direction Y, and the third direction Z. Thus, the plurality of the splicing panels 10 may be adjusted efficiently and quickly through the splicing assembly 2, without the need for workers to repeatedly confirm the position of splicing display screen, improving the splicing seam adjustment accuracy of the splicing display screen 1, and obtaining a good display effect.

Furthermore, referring to FIGS. 2 and 3. In the embodiment, the first adjustment module 23A further includes a first sliding guide rail 23A5, which extends along the first direction X and is fixedly connected to the support frame 21. The first support block 23A1 is slidably connected to the first sliding guide rail 23A5 along the first direction X.

Specifically, the first sliding guide rail 23A5 includes a first guide rail 23A51 and a first sliding rail 23A52, the first guide rail is screwed with the support frame 21. The first sliding rail 23A52 is located on a side of the first guide rail 23A51 close to the first support block 23A1, and the first sliding rail 23A52 is floatingly connected to the first guide rail 23A51. The first support block 23A1 is slidably connected to the support frame 21 by the first sliding rail 23A52.

It can be understood that in the embodiment, the first sliding rail 23A52 is floatingly connected to the first guide rail 23A51, the first guide rail 23A51 is fixedly connected to the support frame 21, and the first support block 23A1 is slidably connected to the support frame 21 by the first sliding rail 23A52. Therefore, in practical applications, the first fixed member 23A4 may be rotated to achieve a reciprocating motion of the first support block 23A1 along the first direction X, making the splicing assembly 2 more convenient to use, reducing the labor intensity of workers, and effectively improving the assembling efficiency of the splicing display screen 1.

Furthermore, in the embodiment, the first support pillar 23A2 includes a first support rod 23A21 and a first handle 23A22. The first handle 23A22 is located on a side of the first support block 23A1 away from the connecting plate 221. One end of the first support rod 23A21 is connected to the first handle 23A22, and another end of the first support rod 23A21 is screwed with the first support block 23A1 through the first through hole 23A11.

Specifically, the first handle 23A22 abuts against the first support block 23A1, the first support rod 23A21 passes through the first through hole 23A11 and is screwed with the first through hole 23A11. The first support rod 23A21 passes through the first support block 23A1 and abuts against the connecting plate 221. In practical applications, the first support rod 23A21 may be rotated to achieve a reciprocating motion along the second direction Y, and then the splicing panel 10 may be driven to a reciprocating motion along the second direction Y by the first support rod 23A21 and the connecting piece 22. Moreover, a shape of the first handle 23A22 may be designed to mimic a shape of a finger grip, making it in line with ergonomics, thereby making the adjustment and operation of the first support pillar 23A2 convenient and labor-saving.

Preferably, the first fixing piece 23A4 includes a second support rod 23A41 and a second handle 23A42, the second handle 23A42 is located on a side of the fixing plate 23A3 away from the first support block 23A1. One end of the second support rod 23A41 is connected to the second handle 23A42, and another end of the second support rod 23A41 is screwed with the first support block 23A1 through the third through hole 23A31.

Specifically, the second handle 23A42 abuts against the fixing plate 23A3, and the second support rod 23A41 passes through the fixing plate 23A3 and is screwed with the first support block 23A1. Furthermore, a shape of the second handle 23A42 may be designed to mimic a shape of a finger grip, making it in line with ergonomics, making the adjustment and operation of the first fixed member 23A4 convenient and labor-saving. In addition, the fixing plate 23A3 further includes a fourth through hole, which runs through the fixing plate 23A3 along the second direction Y. The support frame 21 passes through the fourth through hole and is fixedly connected to the fixing plate 23A3, which is convenient, fast, and improves the stability of the support frame 21.

Furthermore, in the embodiment, the first adjustment module 23A further includes a first locking piece 23A6, which includes a first locking mechanism 23A61 and a second locking mechanism 23A62. The first locking mechanism 23A61 is located between the first support block 23A1 and the first support pillar 23A2. The first locking mechanism 23A61 is screwed with the first support pillar 23A2. The second locking mechanism 23A62 is located on a side of the first sliding guide rail 23A5 close to the first support block 23A1, and the second locking mechanism 23A62 is fixedly connected to the first support block 23A1.

Specifically, the first locking mechanism 23A61 is located between the first handle 23A22 and the first support block 23A1. The first locking mechanism 23A61 is sleeved on the first support rod 23A21, and the first locking mechanism 23A61 is screwed with the first support rod 23A21. Therefore, in practical applications, a fixation of the first support rod 23A21 is capable of being achieved by rotating the first locking mechanism 23A61, keeping the first support pillar 23A2 stable ensures the stability of the splicing assembly 2.

The second locking mechanism 23A62 is located on both sides of the first support block 23A1 along the first direction X. The second locking mechanism 23A62 includes a limit plate 23A621 and a second fixing piece 23A622. One side of the limiting plate 23A621 is fixedly connected to the first support block 23A1, and another side of the limit plate 23A621 is sliding or fixedly connected to the first sliding rail 23A52. The second fixing piece 23A622 is screwed with the limiting plate 23A621. So that in practical applications, the first support block 23A1 is capable of being locked, fixed or loosened by tightening or loosening the second fixing piece 23A622. It should be noted that the second fixing piece 23A622 is spaced with the first sliding guide rail 23A5, and the second fixing piece 23A622 includes but is not limited to a knob.

Preferably, in the embodiment, the splicing assembly 2 further includes a fixing block 23A7. The fixing block 23A7 is located on both sides of the first support block 23A1 in the first direction X. One end of the fixing block 23A7 is fixedly connected to the first support block 23A1, and another end of the fixing block 23A7 is fixedly connected to the limiting plate 23A621, thus in practical applications, when the first support block 23A1 undergoes reciprocating motion along the first direction X, by disposing the fixing block 23A7 located on both sides of the first support block 23A1, a position of the first support block 23A1 is capable of being limited, thereby maintaining the stability of the first support piece and improving the stability of the splicing assembly 2.

Furthermore, referring to FIG. 3. In the embodiment, the first adjustment module 23A further includes a first positioning piece 23A8, which is located on a side of the first support block 23A1 away from the support frame 21. The first positioning piece 23A8 includes a scale 23A81 and a positioning block 23A82, and a graduation of the scale 23A81 is disposed along the second direction Y. The positioning block 23A82 includes a head (not marked in the FIG.), The head is slidably connected to the scale 23A81 along the second direction Y.

Specifically, the first support block 23A1 includes a groove 23A13. The scale 23A81 is located on a side of the first support block 23A1 away from the support frame 21, and an orthographic projection of the scale 23A81 on the first support block 23A1 does not overlap the groove 23A13, the positioning block 23A82 is located in the groove 23A13, the first support pillar 23A2 passes through the positioning block 23A82 along the second direction Y, and the first support pillar 23A2 is screwed with the positioning block 23A82, Thus, the positioning block 23A82 is capable of being achieved to be slidably connected to the scale 23A81 in the second direction Y by rotating the first support pillar 23A2 can be rotated It can be understood that in practical applications, when the first support pillar 23A2 reciprocates in the second direction Y, by disposing the graduation of the scale 23A81 along the second direction Y, the first support pillar 23A2 being screwed with the positioning block 23A82, and the positioning block 23A82 including a head which is slidably connected to the scale 23A81 in the second direction Y, the accuracy and precision of splicing is capable of being controlled, splicing errors is capable of being reduced, and splicing efficiency and overall installation process level are capable of being improved.

Furthermore, referring to FIG. 2, in the embodiment, the support frame 21 includes a first support subframe 211 and a second support subframe 212 disposed in parallel along the third direction Z. The adjustment piece 23 includes the first adjustment module 23A and a second adjustment module 23B, the first adjustment module 23A is located on the first support subframe 211, and the second adjustment module 23B is located on the second support subframe 212. The second adjustment module 23B includes a second support block (not marked in the FIG.), a second support pillar (not marked in the FIG.), a second sliding guide rail (not marked in the FIG.), a second locking piece (not marked in the FIG.), and a second positioning piece (not marked in the FIG.).

It should be noted that a structure of the second support block is similar/identical to that of the first support block 23A1 in the above embodiments. A structure of the second support pillar is similar/identical to that of the first support pillar 23A2 in the above embodiments. A structure of the second sliding guide rail is similar/identical to that of the first sliding guide rail 23A5 in the above embodiments. A structure of the second positioning piece is similar/identical to that of the first positioning piece 23A8 in the above embodiments. For details, please refer to the description of the first adjustment module 23A in the above embodiments, which is not repeated here.

Specifically, the connecting plate 221 further includes a third opening 221C, which is located on a side of the connecting plate 221 close to the adjusting piece 23. The second support pillar passes through the third opening 221C, and the connecting piece 22 is hung on the second support pillar. It can be understood that in the embodiment, the connecting piece 22 is hung on the first support pillar 23A2 which passes through the first opening 221A, the connecting piece 22 is hung on the second support pillar which passes through the third opening 221C, and the connecting piece 22 is screwed and fixed with the splicing panel 10, so that a fixed connection between the splicing assembly 2 and the splicing panel 10 is capable of being achieved.

Furthermore, in some embodiments, the splicing assembly 2 includes at least the first adjustment module 23A and the second adjustment module 23B, and the first adjustment module 23A and the second adjustment module 23B are disposed in parallel. It should be noted that in the embodiment, the technical solutions of the present disclosure are described by taking it as an example that two said splicing panels 10 is spliced, a back side of each splicing panel 10 is provided with two splicing assembly 2, and the splicing assembly 2 includes the first adjustment module 23A and the second adjustment module 23B.

Referring to FIGS. 1 and 2, in the embodiment, the splicing display screen 1 includes a first splicing panel 11, a second splicing panel 12, a first splicing assembly 2A, a second splicing assembly 2B, a third splicing assembly 2C, and a fourth splicing assembly 2D. The first splicing assembly 2A and the second splicing assembly 2B are disposed on a back side of the first splicing panel 11, and the third splicing assembly 2C and the fourth splicing assembly 2D are disposed on a back side of the second splicing panel 12.

It can be understood that in the embodiment, the first splicing assembly 2A and the second splicing assembly 2B are disposed on the back side of the first splicing panel 11. The first splicing assembly 2A includes a first adjustment module 23A and a second adjustment module 23B, and the second splicing assembly 2B includes a first adjustment module 23A and a second adjustment module 23B. Therefore, in practical applications, By simultaneously rotating the first fixing pieces 23A4 of the first adjustment modules 23A of the first splicing assembly 2A and the second splicing assembly 2B, or simultaneously rotating the first fixing pieces 23A4 of the second adjustment modules 23B of the first splicing assembly 2A and the second splicing assembly 2B, a rotation of the first splicing panel 11 on the first axis L1 is capable of being achieved, thereby achieving the angle adjustment of the first splicing panel 11 on the first axis L1.

Moreover, in practical applications, the first adjustment-sub part 222A of the first splicing assembly 2A or the first adjustment sub-part 222A of the second splicing assembly 2B may be rotated to achieve a rotation of the first splicing panel 11 on the second axis L2, thereby achieving the angle adjustment of the first splicing panel 11 on the second axis L2. For details, please refer to the description of the first adjustment module 23A in the above embodiments, which is not repeated here.

Furthermore, in practical applications, By simultaneously rotating the first fixing pieces 23A4 of the first adjustment modules 23A of the first splicing assembly 2A and the first fixing pieces 23A4 of the second adjustment modules 23A of the first splicing assembly 2A, or simultaneously rotating the first fixing pieces 23A4 of the first adjustment modules 23B of the second splicing assembly 2A and the first fixing pieces 23A4 of the second adjustment modules 23B of the second splicing assembly 2A, a rotation of the first splicing panel 11 on the third axis L3 is capable of being achieved, thereby achieving the angle adjustment of the first splicing panel 11 on the third axis L3. It should be noted that in the embodiment, the first axis L1 extends along the first direction X, the second axis L2 extends along the second direction Y, and the third axis L3 extends along the third direction Z.

Similarly, in practical applications, the angle adjustment of the second splicing panel 12 on the first axis L1, the second axis L2, and the third axis L3 may be achieved by adjusting the third splicing assembly 2C and the fourth splicing assembly 2D.

Based on the above, the embodiment provides the splicing assembly 2 and the splicing display screen 1. The splicing display screen 1 includes the plurality of the splicing panels 10, and the splicing assembly 2 is used to splice the plurality of the splicing panels 10. The splicing assembly 2 is screwed and fixed with the splicing panel 10, thereby comprehensively adjusting the position of the splicing panel 10 in multiple directions. Thus, the plurality of the splicing panels 10 may be adjusted efficiently and quickly through the splicing assembly 2, without the need for workers to repeatedly confirm the position of splicing display screen, improving the splicing seam adjustment accuracy of the splicing display screen 1, and obtaining a good display effect.

In summary, the embodiments of the present disclosure disclose the splicing assembly and the splicing display screen. The splicing assembly includes the support frame, the connecting piece and the adjusting piece. The connecting piece is located on the side of the support frame and includes the connecting plate and the adjusting part. The adjusting piece is disposed on the support frame and includes the first adjustment module. The first adjustment module includes the first support block and the first support pillar, the first support block is slidably connected to the support frame along the first direction, and the first support pillar passes through the first support block and the connecting plate in sequence along the second direction. The first support pillar is screwed with the first support block. The connecting plate is hung on the first support pillar. The adjusting part passes through the connecting plate along the third direction and abuts against the first support pillar. The adjusting part is screwed with the connecting plate. Thus, the plurality of the splicing panels may be adjusted efficiently and quickly through the splicing assembly, thereby improving the splicing seam adjustment accuracy of the splicing display screen to obtain a good display effect.

In summary, although the present disclosure has been disclosed in the above preferred embodiments, the above preferred embodiments do not intend to limit the present disclosure. Various modifications and changes may be made by ordinary person skilled in the art without departing from the spirit and scope of this disclosure. Therefore, the scope of protection of this application is subject to the scope defined by the claims.

What is claimed is:

1. A splicing assembly, comprising:
   a support frame;
   a connecting piece located on a side of the support frame and comprising a connecting plate and an adjusting part; and
   an adjusting piece disposed on the support frame and comprising a first adjustment module;
   wherein the first adjustment module comprises a first support block and a first support pillar, the first support block is slidably connected to the support frame along a first direction, the first support pillar passes through the first support block and the connecting plate along a second direction in sequence, the first support pillar is screwed with the first support block, the connecting plate is hung on the first support pillar, the adjusting part passes through the connecting plate along a third direction and abuts against the first support pillar, the adjusting part is screwed with the connecting plate, and the first direction, the second direction and the third direction are perpendicular to each other.

2. The splicing assembly of claim 1, wherein the first adjustment module further comprises a fixing plate and a first fixing piece, the fixing plate is fixedly connected to the support frame, and the first fixing piece passes through the fixing plate along the first direction and is screwed with the first support block.

3. The splicing assembly of claim 2, wherein the first support block comprises a first through hole and a second through hole, the first through hole penetrates the first support block along the second direction, and the second through hole is located on a side of the first support block close to the fixing plate;
   the fixing plate comprises a third through hole, the third through hole penetrates the fixing plate along the first direction, and the third through hole corresponds to the second through hole; and
   the first support pillar passes through the first through hole and is screwed with the first support block, the first fixing piece passes through the third through hole and the second through hole, and the first fixing piece is screwed with the first support block through the second through hole.

4. The splicing assembly of claim 3, wherein the first adjustment module further comprises a first sliding guide rail, and the first sliding guide rail extends along the first direction and is fixedly connected to the support frame, and the first support block is slidably connected to the first sliding guide rail along the first direction.

5. The splicing assembly of claim 4, wherein the first adjustment module further comprises a first locking piece, and the first locking piece comprises a first locking mechanism and a second locking mechanism; and
   the first locking mechanism is located between the first support block and the first support pillar, the first locking mechanism is screwed with the first support pillar, and the second locking mechanism is located on a side of the first sliding guide rail close to the first support block, and the second locking mechanism is fixedly connected to the first support block.

6. The splicing assembly of claim 5, wherein the first support pillar comprises a first support rod and a first handle, the first handle is located on a side of the first support block away from the connecting plate, one end of the first support rod is connected to the first handle, and another end of the first support rod is screwed with the first support block through the first through hole; and
   the first locking mechanism is located between the first handle and the first support block, the first locking mechanism is sleeved on the first support rod, and the first locking mechanism is screwed with the first support rod.

7. The splicing assembly of claim 5, wherein the first sliding guide rail comprises a first sliding rail and a first guide rail, the first guide rail is screwed with the support frame, the first sliding rail is located on a side of the first guide rail close to the first support block, the first sliding rail is floatingly connected to the first guide rail, and the first support block is slidably connected to the support frame by the first sliding rail; and the second locking mechanism is located on both sides of the first support block along the first direction, the second locking mechanism comprises a limiting plate and a second fixing piece, one side of the limiting plate is fixedly connected to the first support block, another side of the limiting plate is slidably connected or fixedly connected to the first sliding rail, and the second fixing piece is screwed with the limiting plate.

8. The splicing assembly of claim 1, wherein the first adjustment module further comprises a first positioning piece, the first positioning piece is located on a side of the first support block away from the support frame, the first positioning piece comprises a scale and a positioning block, a graduation of the scale is disposed along the second direction, the positioning block comprises a head, and the head is slidably connected to the scale along the second direction.

9. The splice assembly of claim 8, wherein the first support block comprises a groove; and the scale is located on a side of the first support block away from the support frame, an orthographic projection of the scale on the first support block does not overlap the groove, the positioning block is located in the groove, the first support pillar passes through the positioning block along the second direction, and the first support pillar is screwed with the positioning block.

10. The splicing assembly of claim 1, wherein the connecting plate comprises a first opening and a second opening, the first opening is located on a side of the connecting plate close to the adjusting piece, and the second opening penetrates the connecting piece along the third direction;

the first support pillar passes through the first opening, and the connecting piece is hung on and connected to the first support pillar; and the adjusting part comprises a first adjusting sub-part, and the first adjusting sub-part passes through the second opening along the third direction and abuts against the first support pillar.

11. The splicing assembly of claim 1, wherein the support frame comprises a first support subframe and a second support subframe disposed in parallel along the third direction; and the adjusting piece comprises the first adjustment module and a second adjustment module, the first adjustment module is located on the first support sub-frame, and the first adjustment module is located on the second support sub-frame;

wherein the second adjustment module comprises a second support block, a second support pillar, a second fixing piece, a second sliding guide rail, a second locking piece and a second positioning piece.

12. A splicing display screen, comprising:

a plurality of splicing panels; and a plurality of splicing assemblies, wherein a back side of each of the splicing panels is provided with at least one of the splicing assemblies, the plurality of the splicing assemblies are spliced to splice the plurality of the splicing panels, and each of the splicing assemblies comprises:

a support frame;

a connecting piece located on a side of the support frame and comprising a connecting plate and an adjusting part; and an adjusting piece disposed on the support frame and comprising a first adjustment module;

wherein the first adjustment module comprises a first support block and a first support pillar, the first support block is slidably connected to the support frame along a first direction, the first support pillar passes through the first support block and the connecting plate along a second direction in sequence, the first support pillar is screwed with the first support block, the connecting plate is hung on the first support pillar, the adjusting part passes through the connecting plate along a third direction and abuts against the first support pillar, the adjusting part is screwed with the connecting plate, and the first direction, the second direction and the third direction are perpendicular to each other.

13. The splicing display screen of claim 12, wherein one of the splicing assemblies at least comprises the first adjustment module and a second adjustment module in parallel along the third direction, and structures of the second adjustment module is identical to structures of the first adjustment module.

14. The splicing display screen of claim 12, wherein each of the splicing assemblies is screwed and fixed with corresponding one of the splicing panels.

15. The splicing display screen of claim 12, wherein the first adjustment module further comprises a fixing plate and a first fixing piece, the fixing plate is fixedly connected to the support frame, and the first fixing piece passes through the fixing plate along the first direction and is screwed with the first support block.

16. The splicing display screen of claim 15, wherein the first support block comprises a first through hole and a second through hole, the first through hole penetrates the first support block along the second direction, and the second through hole is located on a side of the first support block close to the fixing plate;

the fixing plate comprises a third through hole, the third through hole penetrates the fixing plate along the first direction, and the third through hole corresponds to the second through hole; and the first support pillar passes through the first through hole and is screwed with the first support block, the first fixing piece passes through the third through hole and the second through hole, and the first fixing piece is screwed with the first support block through the second through hole.

17. The splicing display screen of claim 16, wherein the first adjustment module further comprises a first sliding guide rail, and the first sliding guide rail extends along the first direction and is fixedly connected to the support frame, and the first support block is slidably connected to the first sliding guide rail along the first direction.

18. The splicing display screen of claim 17, wherein the first adjustment module further comprises a first locking piece, and the first locking piece comprises a first locking mechanism and a second locking mechanism; and the first locking mechanism is located between the first support block and the first support pillar, the first locking mechanism is screwed with the first support pillar, and the second locking mechanism is located on a side of the first sliding guide rail close to the first support block, and the second locking mechanism is fixedly connected to the first support block.

19. The splicing display screen of claim 18, wherein the first support pillar comprises a first support rod and a first handle, the first handle is located on a side of the first support block away from the connecting plate, one end of the first support rod is connected to the first handle, and another end of the first support rod is screwed with the first support block through the first through hole; and the first locking mechanism is located between the first handle and the first support block, the first locking mechanism is sleeved on the first support rod, and the first locking mechanism is screwed with the first support rod.

20. The splicing display screen of claim 18, wherein the first sliding guide rail comprises a first sliding rail and a first guide rail, the first guide rail is screwed with the support frame, the first sliding rail is located on a side of the first guide rail close to the first support block, the first sliding rail is floatingly connected to the first guide rail, and the first support block is slidably connected to the support frame by the first sliding rail; and the second locking mechanism is located on both sides of the first support block along the first direction, the second locking mechanism comprises a limiting plate and a second fixing piece, one side of the limiting plate is fixedly connected to the first support block, another side of the limiting plate is slidably connected or fixedly connected to the first sliding rail, and the second fixing piece is screwed with the limiting plate.

* * * * *